(12) United States Patent
Hikosaka et al.

(10) Patent No.: US 11,841,040 B2
(45) Date of Patent: *Dec. 12, 2023

(54) FASTENING STRUCTURE AND FASTENING METHOD

(71) Applicant: NIPPON STEEL NISSHIN CO., LTD., Tokyo (JP)

(72) Inventors: Akiyoshi Hikosaka, Tokyo (JP); Kouki Tomimura, Tokyo (JP)

(73) Assignee: NIPPON STEEL NISSHIN CO., LTD., Tokyo (JP)

( * ) Notice: Subject to any disclaimer, the term of this patent is extended or adjusted under 35 U.S.C. 154(b) by 372 days.

This patent is subject to a terminal disclaimer.

(21) Appl. No.: 16/483,030

(22) PCT Filed: Jan. 31, 2018

(86) PCT No.: PCT/JP2018/003186
§ 371 (c)(1),
(2) Date: Aug. 1, 2019

(87) PCT Pub. No.: WO2018/143265
PCT Pub. Date: Aug. 9, 2018

(65) Prior Publication Data
US 2020/0018339 A1 Jan. 16, 2020

(30) Foreign Application Priority Data
Feb. 2, 2017 (JP) .................. 2017-018006

(51) Int. Cl.
*F16B 19/00* (2006.01)
*F16B 19/05* (2006.01)
*F16B 5/04* (2006.01)

(52) U.S. Cl.
CPC .............. *F16B 19/05* (2013.01); *F16B 5/04* (2013.01)

(58) Field of Classification Search
CPC . F16B 19/05; F16B 5/04; F16B 39/026; B21J 15/022; E04B 2001/2418; E04B 1/2403; E05B 5/04
See application file for complete search history.

(56) References Cited

U.S. PATENT DOCUMENTS 1,970,965 A * 8/1934 Leake .................. E04B 1/2403
403/230
2,268,416 A * 12/1941 Nelson .................. B23K 9/201
219/98

(Continued)

FOREIGN PATENT DOCUMENTS

GB      2083586 A * 3/1982 .............. F16B 19/05
GB      2343642 A * 5/2000 .............. F16B 19/05

(Continued)

OTHER PUBLICATIONS

China Patent Office, Office action dated Mar. 23, 2020.

(Continued)

*Primary Examiner* — Gary W Estremsky
(74) *Attorney, Agent, or Firm* — Li & Cai Intellectual Property Office

(57) ABSTRACT

The present invention provides a fastening structure and a fastening method for fastening first and second components, ensuring a high degree of freedom in terms of bonding positions and objects, and reducing the number of holes in the components. Specifically, the present invention provides a fastening structure for fastening the first and second components, wherein said fastening structure comprises a pin that has non-helical grooves running in a circumferential direction and aligned along a longitudinal direction, and a collar that is fitted around said pin, and said pin is united with said first component by bonding one end of said pin in the longitudinal direction to said first component without forming a hole in said first component, and said second (Continued)

component has a hole for inserting said pin so that said collar is fitted around and swaged to said pin protruding through the hole.

3 Claims, 17 Drawing Sheets

(56) References Cited

U.S. PATENT DOCUMENTS

| | | | | |
|---|---|---|---|---|
| 3,066,568 A * | 12/1962 | Armour | ............... | F16B 19/008 411/361 |
| 3,139,786 A * | 7/1964 | Ardell | .................... | F16B 19/05 411/361 |
| 3,363,084 A * | 1/1968 | Busing | ............... | B23K 35/0288 219/99 |
| 3,671,710 A * | 6/1972 | Coombs | ............. | B23K 35/0288 219/99 |
| 3,840,124 A * | 10/1974 | Atwater | ................. | F16B 7/044 211/183 |
| 3,891,332 A * | 6/1975 | Molyneux | ................ | F16B 9/01 411/397 |
| 3,915,052 A * | 10/1975 | Ruhl | ....................... | F16B 19/05 411/361 |
| 3,965,792 A * | 6/1976 | King, Jr. | ................. | F16B 4/004 411/361 |
| 4,074,449 A * | 2/1978 | Lanz | .................... | E02F 9/2816 172/745 |
| 4,472,096 A * | 9/1984 | Ruhl | ....................... | F16B 19/05 411/361 |
| 4,579,493 A * | 4/1986 | Schaty | ............... | F16B 37/0842 411/908 |
| 4,850,772 A * | 7/1989 | Jenkins | ............. | B23K 35/0288 228/2.3 |
| 4,867,625 A * | 9/1989 | Dixon | ..................... | F16B 19/05 411/361 |
| 4,983,085 A * | 1/1991 | Gray | ....................... | B25B 13/48 411/336 |
| 5,054,980 A * | 10/1991 | Bidefeld | ............ | B23K 35/0288 411/258 |
| 5,171,115 A * | 12/1992 | McWilliams | ........... | F16B 19/05 72/453.17 |
| 5,326,208 A * | 7/1994 | Werner | ................. | F16B 37/002 411/908 |
| 5,393,164 A * | 2/1995 | Renner | .................. | B23K 9/208 219/99 |
| 5,562,379 A * | 10/1996 | Rausch | .................. | F16B 19/05 411/361 |
| 5,579,986 A * | 12/1996 | Sherry | .................... | F16B 19/05 228/175 |
| 5,618,491 A * | 4/1997 | Kurup | ................ | B23K 35/0288 148/333 |
| 5,685,663 A * | 11/1997 | Sadri | ..................... | E04B 1/2403 403/2 |
| 5,742,029 A * | 4/1998 | Stava | ................... | B23K 9/1043 219/130.31 |
| 6,325,582 B1 * | 12/2001 | Sadri | ..................... | B21J 15/022 411/361 |
| 6,341,917 B1 * | 1/2002 | Schubring | ......... | B29C 66/73921 403/299 |
| 6,648,412 B2 * | 11/2003 | Moradell | ................ | B60N 2/22 411/399 |
| 7,575,149 B2 * | 8/2009 | De Traglia Amancio Filho | ......... | B29C 66/45 228/136 |
| 8,708,628 B2 * | 4/2014 | Hotte | ...................... | F16B 11/00 228/114.5 |
| 9,120,188 B2 * | 9/2015 | Hotte | ................... | B23K 20/127 |
| 9,259,810 B2 * | 2/2016 | Hotte | ................... | F16B 17/006 |
| 9,803,678 B2 * | 10/2017 | Fernandez | ............. | B23K 9/207 |
| 2001/0029651 A1 * | 10/2001 | Fulbright | ................ | B21J 15/28 29/243.522 |
| 2003/0210969 A1 * | 11/2003 | Schultz | ................... | F16B 19/05 411/361 |
| 2004/0050013 A1 * | 3/2004 | Okada | .................. | E04B 1/2403 52/848 |
| 2005/0183260 A1 * | 8/2005 | Meyer | ...................... | B64C 1/12 29/524.1 |
| 2007/0172335 A1 * | 7/2007 | Christ | ................... | F16B 37/061 411/408 |
| 2015/0252833 A1 * | 9/2015 | Brewer | ................... | F16B 19/05 29/509 |
| 2016/0002909 A1 * | 1/2016 | Bowron | ................... | E04B 1/40 52/745.03 |
| 2017/0022726 A1 * | 1/2017 | Sun | ....................... | E04B 1/2403 |
| 2018/0142490 A1 * | 5/2018 | Eblen | ..................... | E04H 12/12 |
| 2019/0063057 A1 * | 2/2019 | Preddy | ..................... | E04C 3/07 |
| 2020/0018338 A1 * | 1/2020 | Hikosaka | ................ | F16B 19/05 |
| 2020/0056365 A1 * | 2/2020 | Navon | ..................... | E04C 3/07 |
| 2020/0166066 A1 * | 5/2020 | Brennetot | .............. | F16B 19/05 |

FOREIGN PATENT DOCUMENTS

| | | |
|---|---|---|
| GB | 2343642 A | 5/2000 |
| JP | S63-18518 U | 2/1988 |
| JP | 4686130 B2 | 5/2011 |
| WO | WO9401687 A1 | 1/1994 |

OTHER PUBLICATIONS

Alcoa Fastening Systems, "The Unshakeable World of Huck Fastening Systems" <U R L : http://www.asia.afshuck.net/jp/Fasteners. html> <U R L : http://www.asia.afshuck.net/en/Fasteners.html>.
Japanese Patent Office, Office Action dated Jul. 6, 2018.
European Patent Office, Patent Search Report dated Feb. 21, 2020.
China Patent Office, Office action dated Jun. 30, 2020.

\* cited by examiner

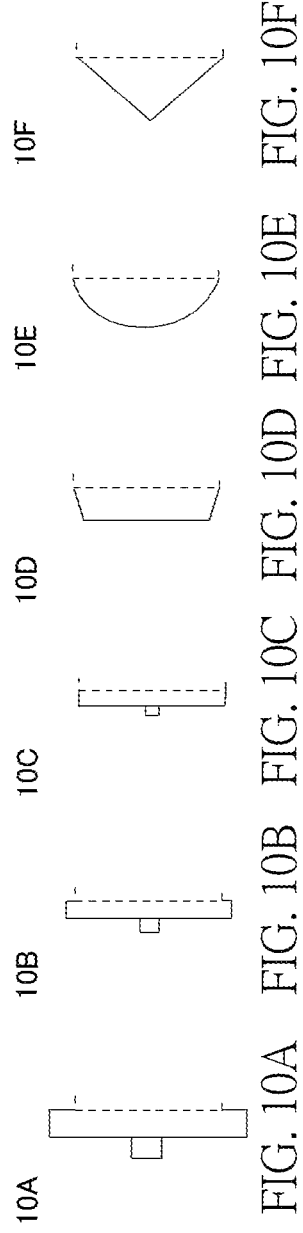
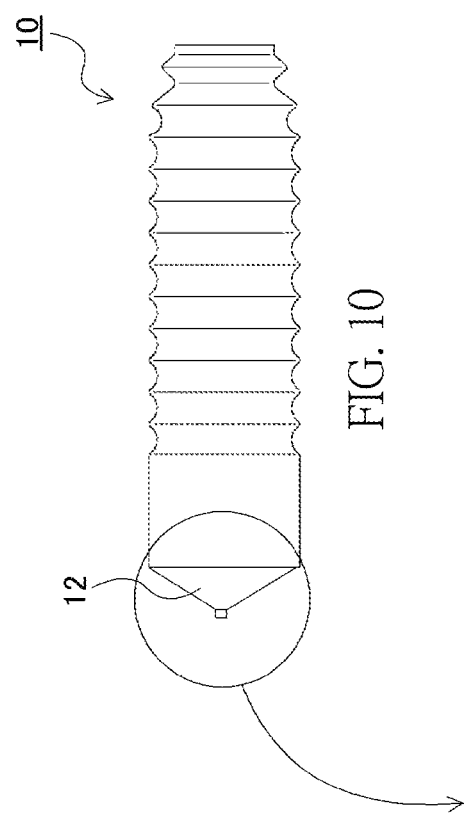
FIG. 10
FIG. 10A FIG. 10B FIG. 10C FIG. 10D FIG. 10E FIG. 10F

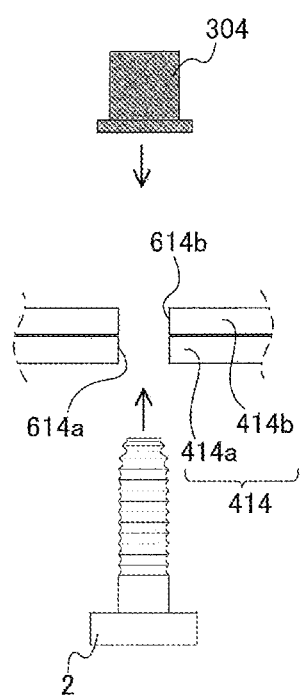
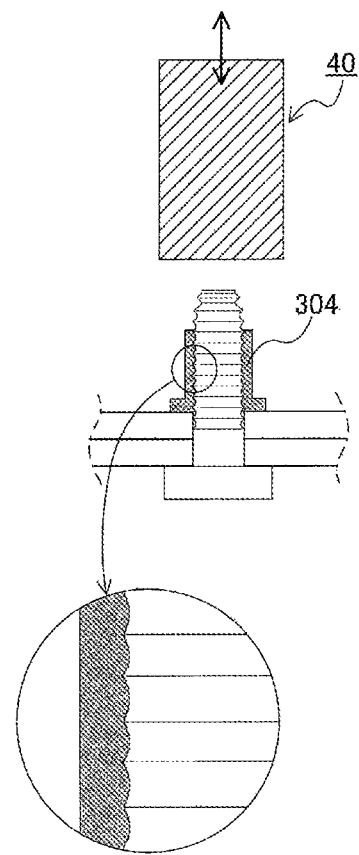
FIG. 11A
(PRIOR ART)
FIG. 11B
(PRIOR ART)

FASTENING STRUCTURE AND FASTENING METHOD

BACKGROUND OF THE INVENTION

1. Field of the Invention

The present invention relates to a structure and a method for fastening first and second components.

2. Description of Related Art

Some devices, such as drum type washing machines, solar power generators, and natural refrigerant heat pump water heaters (EcoCute), are gaining popularity in households. However, these devices have a problem: the vibration during their operation may loosen the bolt-and-nut jointing inside and outside the devices, resulting in the falling of bolts and nuts or the devices themselves.

Patent document 1 and non-patent document 1 describe fasteners, in which the collar is swaged to the groove part of the pin by applying a relative force in the axial direction between the pin and the collar using a tool, realizing high strength and high resistance against vibration.

CITATION LIST

Patent Literature

Patent document 1 Japanese Patent No. 4686130 Non-patent document 1 Alcoa Fastening Systems, Operations Department, Unshakable world of Huck fastening systems, http://www.asia.afshuck.net/jp/Fasteners.html (viewed on 2017 Jan. 4).

SUMMARY OF THE INVENTION

Technical Problem

The pins in patent document 1 and non-patent document 1 involve a forming of holes for inserting the pins (see the holes (614a, 614b) in FIG. 11A) in the bonding objects, which requires sufficient space and places restrictions on fastening positions and objects. This problem is explained below with reference to FIGS. 12 to 14.

FIG. 12 illustrates a method for fastening two components (416a, 416b) using the pin and the collar described in patent document 1 or non-patent document 1. This method forms a hole (616a) in one component (416a) and another hole (616b) in the other component (416b). The two holes (616a, 616b) are stacked on top of each other before inserting the conventional pin (2) from the upper side of the hole (616a) to the lower side of the hole (616b). Then the collar (304) is fitted around the shaft of the pin (2) protruding through the holes (616a, 616b). Finally the collar (304) is bonded to the shaft of the conventional pin (2) by swaging using a tool (not illustrated). If the conventional pin (2) is inserted from the lower side of the hole (616b), the component (416b) may fall before bonding the collar (304).

FIG. 13 shows a fastening of an H-shaped steel component (400a) and a U-shaped steel component or other U-shaped component (400b) so that their centerlines correspond. The U-shaped component (400b) allows forming a hole (600) on the centerline, but the H-shaped component (400a) does not allow forming a hole on the centerline because the web is positioned on the centerline. Therefore, this fastening structure is impossible.

FIG. 14 shows the fastening of a metal pipe (400a) and a U-shaped steel component or other U-shaped component (400b) so that their centerlines correspond. The U-shaped component (400b) allows forming a hole (600b), and the metal pipe (400a) also allows forming a hole (600a). However, after stacking the two holes (600a, 600b) on top of each other, it may be difficult to insert the conventional pin (2) from the lower side of the hole (600a) to the upper side of the hole (600b) if the metal pipe (400a) is long and therefore the insertion point is far from the ends of the metal pipe (400a).

The pins in non-patent document 1 have another problem: the pins facing each other may be an obstacle (see FIG. 15), for example, when installing a natural refrigerant heat pump water heater or an air conditioner outdoor unit.

Furthermore, the forming of holes in the fastening objects may cause water leakage, sound leakage, strength decrease, as well as labor and cost increase (for long components that require a large number of hole pairs (see FIGS. 16 and 17)).

The present invention provides a fastening structure and a fastening method for fastening first and second components, ensuring a high degree of freedom in terms of bonding positions and objects, and reducing the number of holes in the components.

Solution to Problem (1) The present invention provides a fastening structure for fastening the first and second components, wherein said fastening structure comprises a pin that has non-helical grooves running in a circumferential direction and aligned along a longitudinal direction, and a collar that is fitted around said pin, and said pin is united with said first component by bonding one end of said pin in the longitudinal direction to said first component without forming a hole in said first component, and said second component has a hole for inserting said pin so that said collar is fitted around and swaged to said pin protruding through the hole.

The fastening structure according to the present invention comprises a pin and a collar that covers the pin to fasten the first and second components. The shaft of the pin has grooves running in a circumferential direction, but these grooves do not have a helical structure. That is, the adjacent grooves are not connected. Thus, the shaft of the pin is different from those of conventional screws and bolts with a helical groove continuous in a longitudinal direction. If the pin had a helical structure, a single groove would continue from the non-head end to the head of the pin, but according to the present invention, the grooves of the pin are independent lanes. That is, the adjacent grooves are not connected. This groove structure can prevent the loosening of the pin and the collar (described later) in engagement even in strongly vibrating environments, free from such a risk that ordinary screws may rotate in the direction opposite to the screwing direction.

One end in the longitudinal direction of the pin according to the present invention has a bonding part (chip) instead of a head that ordinary bolts or the like have. The bonding can be performed, for example, by welding and other processes. The first and second components are fastened together as follows: The bonding part of the pin is bonded to a part of the first component (a part for fastening the first and second components) by welding and other processes. The other end of the pin (opposite to the end welded to the first component) is inserted into an insertion hole preformed in the second component. The collar is fitted around the groove part of the pin protruding through the second component. Then the diameter of the collar is reduced to engage the inner wall of the collar with the grooves of the pin. Thus, the first and second components are fastened together using the pin. In this specification, welding may mean bonding.

The non-helical grooves running in a circumferential direction and aligned in a longitudinal direction are substantially concentric with the central axis of the pin. Thus, the components and the fastening member after fastening never loosen due to vibration or the like.

The present invention bonds the pin to the first component, without needing to form a hole, at least in the first component. The use of the pin according to the present invention allows fastening the components (the first and second components) together even in parts where forming a hole is difficult.

Unlike conventional bolts, the pin according to the present invention does not have a head, but the pin is united with the first component by bonding it to the first component. Therefore, the fastening of the components (the first and second components) according to the present invention is possible if the second component has an insertion hole for the pin. That is, the first component does not need to have an insertion hole, provided that the first component can be bonded with the pin.

(2) The present invention provides a fastening method for fastening the first and second components, wherein said fastening method comprises a pin that has non-helical grooves running in a circumferential direction and aligned along a longitudinal direction, and a collar that is fitted around said pin, and said pin is united with said first component by bonding one end of said pin in the longitudinal direction to said first component without forming a hole in said first component, said second component has a hole and is fitted around said pin, which has been united with said first component, from the other end of said pin in the longitudinal direction, and said collar is fitted around said pin, which has penetrated said second component, from the other end of said pin in the longitudinal direction and swaged to said pin.

When fastening the first and second components together, the method according to the present invention unites the pin with one of the first and second components by bonding one end in the longitudinal direction of the pin to that component, and fits the collar around the other end in the longitudinal direction of the pin that has penetrated the other component, followed by the swaging of the collar to the pin, thus allowing maintaining high strength and resistance against vibration.

The component (the first or second component) to which the pin should be bonded can be chosen, for example, as follows: the pin is preferably bonded to the component that poses more difficulty—due to a ring-like form of the component or other reasons—with forming an insertion hole, inserting the pin into the insertion hole, and swaging the protruding side with the collar.

As in (1), the non-helical grooves running in a circumferential direction and aligned in a longitudinal direction are substantially concentric with the central axis of the pin.

Advantageous Effects of Invention

The present invention provides a fastening structure and a fastening method for fastening first and second components, ensuring a high degree of freedom in terms of bonding positions and objects, and reducing the number of holes in the components.

BRIEF DESCRIPTION OF THE DRAWINGS

FIG. 10 shows the pin of the embodiment; and FIGS. 10A to 10F show modified examples of the bonding part of the pin in the embodiment.

FIGS. 11A to 11B show a fastening procedure for fastening components using a conventional pin.

DETAILED DESCRIPTION OF THE PREFERRED EMBODIMENTS

Figure 1:
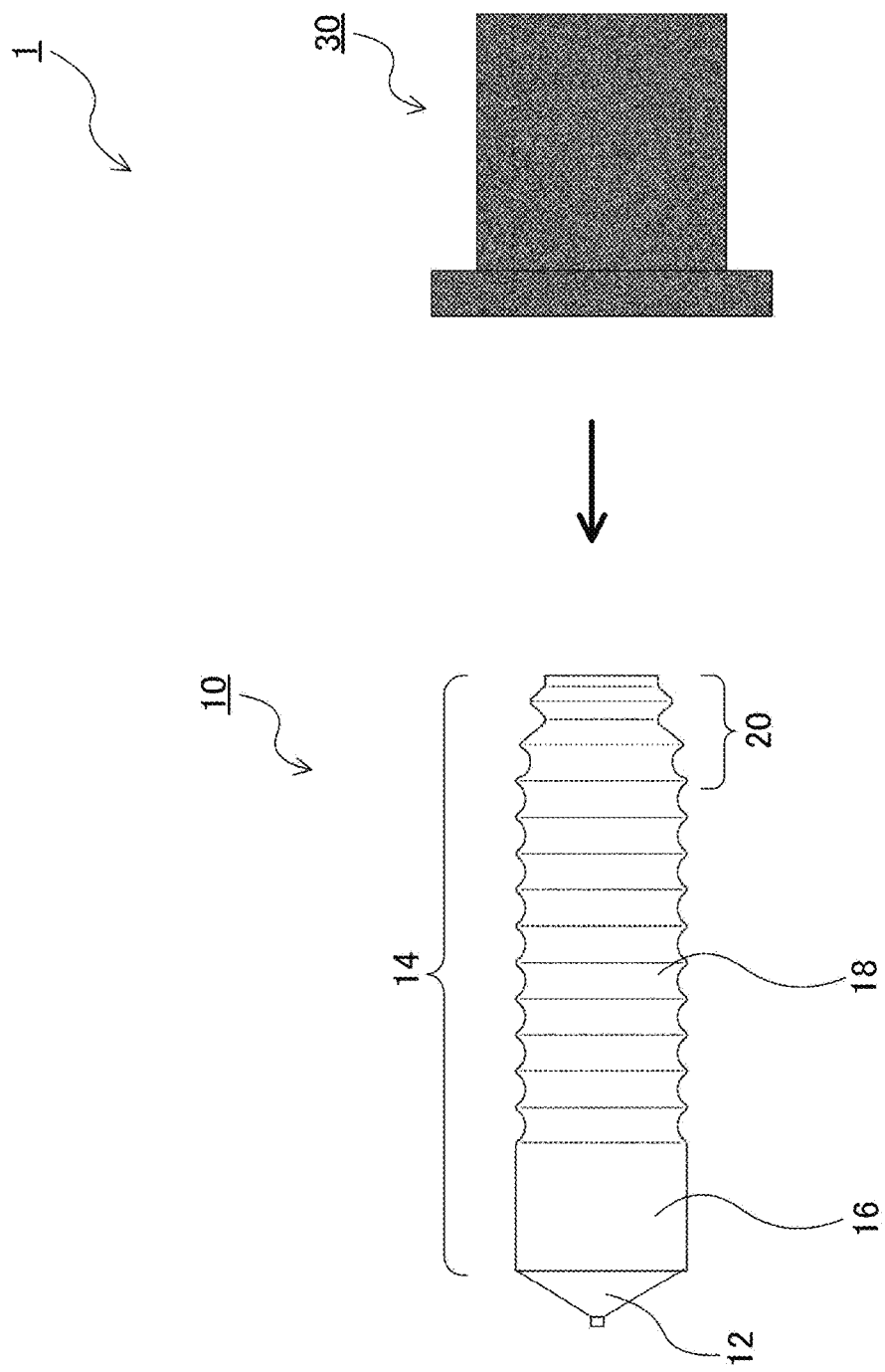
FIG. 1 shows the fastening member (a pin and a collar) in an embodiment of the present invention.
Figure 2B:
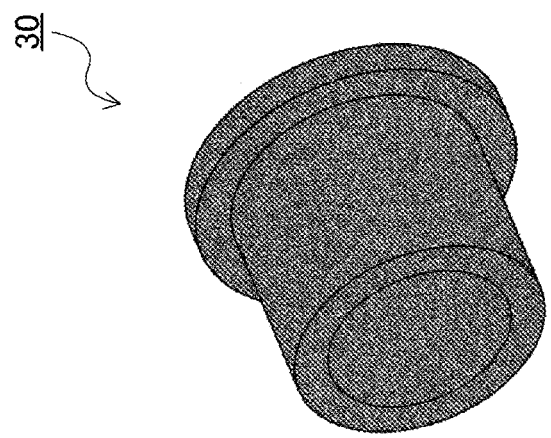
FIG. 2B is a perspective view of a collar of the fastening member in the embodiment.
Figure 2A:
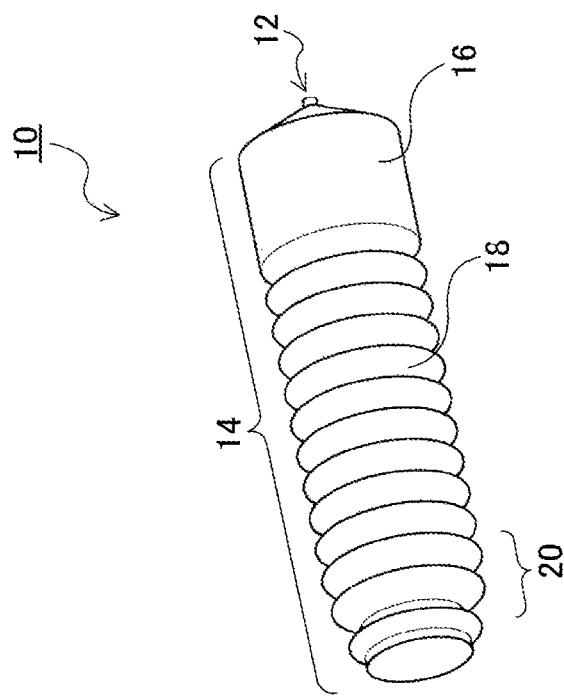
FIG. 2A is a perspective view of a pin of the fastening member in the embodiment.

Below is a description of the fastening member (1) in an embodiment of the present invention with reference to FIGS. 1, 2A, and 2B. As shown in FIG. 1, the fastening member (1) comprises a pin (10) and a collar (30). The pin (10) has a bonding part (12) and a shaft (14). The bonding part (12) has a cone form, and the top is provided with a protrusion. The bonding part (12) is a tip in welding, and there are no special restrictions on the form of the bonding part (12) (the details will be described later). The shaft (14) has, at a minimum, a groove part (18) and a non-welding end ridge part (20). The non-welding end ridge part (20) corresponds to three or so ridges at the non-welding end. How the pin (10) and the collar (30) fasten the components (4) will be described later. FIG. 2A is a perspective view of the pin (10) of the fastening member (1) in this embodiment, and FIG. 2B is a perspective view of the collar (30) of the fastening member (1) in this embodiment. Unlike the groove part (18), the pillar part (16) does not need grooves because the pillar part (16) does not engage with the collar (30). However, the pillar part (16) may have grooves from the base (not illustrated).

Unlike ordinary screws, the grooves of the groove part (18) in this embodiment do not have a helical structure. That is, the grooves are independent lanes and each has a ring form. Thus, the adjacent grooves are not connected. The grooves are formed according to the length of the shaft (14), nearly reaching the non-welding end of the shaft (14).

The independent grooves of the groove part (18), or the unconnected adjacent grooves, prevent the screwed pin (10) from rotating in the direction opposite to the screwing direction and thus loosening due to vibration and the like after two or more components (the components (4) in this embodiment, which will be described later) are fastened together using the fastening member (1) (the pin (10) and the collar (30)).

The following is a description of the procedure for fastening components (4) using the fastening member (1) according to the present invention, more specifically the procedure for fastening the first and second components (4a, 4b) using the pin (10) and the collar (30), with reference to FIGS. 3A to 4D. These figures show the cross-section of the components (4) to be fastened (the cross-section is simply shown without hatching or the like). In this embodiment, the components (4) to be fastened are the first and second components (4a, 4b).

The first component (4a) is a planar component to which the bonding part (12) of the pin (10) can be welded. The second component (4b) is a planar component with an insertion hole (6) for inserting the pin (10). The form of the insertion hole (6) corresponds to the cross-section of the pin (10) (specifically the pillar part (16)). This means that when the pin (10) is inserted into the insertion hole (6), the outer circumferential surface of the pin (10) (specifically the pillar part (16)) comes into substantial contact with the inner circumferential surface of the insertion hole (6).

In this embodiment, the first and second components (4a, 4b) are planar components. However, planar components are not an absolute requirement. It is also possible that those components have a planar part that allows the welding or insertion of the pin (10), or that the components do not have a planar part but have a form that allows the welding or insertion of the pin (10).

Figure 3A:
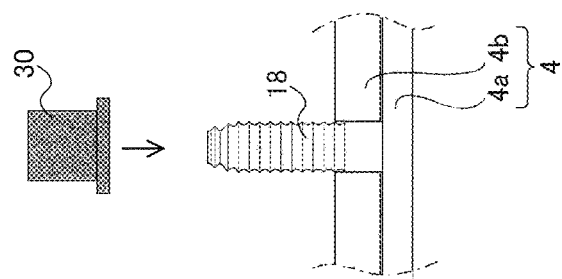
FIGS. 3A to 3C show the fastening procedure for fastening components using the fastening member in the embodiment.

As shown in FIG. 3A, the pin (10) is welded to the fixation position (5) of the first component (4a). In this embodiment, the bonding part (12) of the pin (10) is directed and welded to the fixation part (5) of the first component (4a) so that the shaft (14) of the pin (10) stands substantially vertically on the surface of the component (4a). The fixation position (5) is determined depending on which part the first and second components (4a, 4b) are fastened. The welding is performed by momentarily conducting electricity using an instant welding machine (not illustrated), for example, a stud welding machine.

Figure 3B:
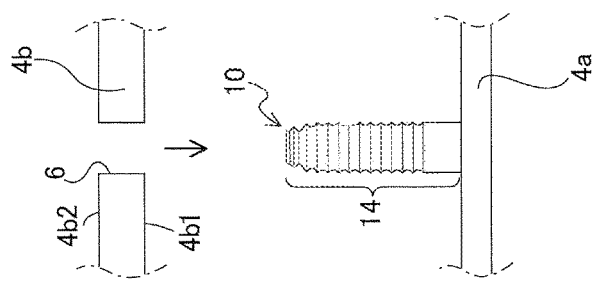

As shown in FIG. 3B, the pin (10) is welded to the first component (4a) so that the shaft (14) of the pin (10) stands substantially vertically on the surface of the first component (4a), and the shaft (14) of the pin (10) thus united with the first component (4a) is inserted into the insertion hole (6) in the second component (4b).

Figure 3C:
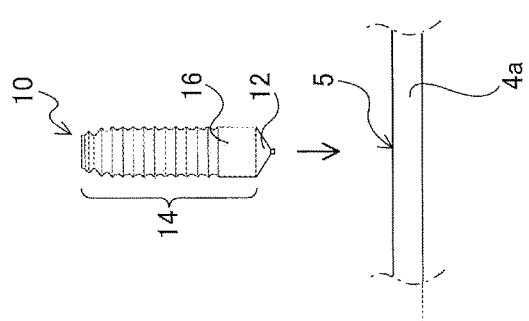
Figure 4A:
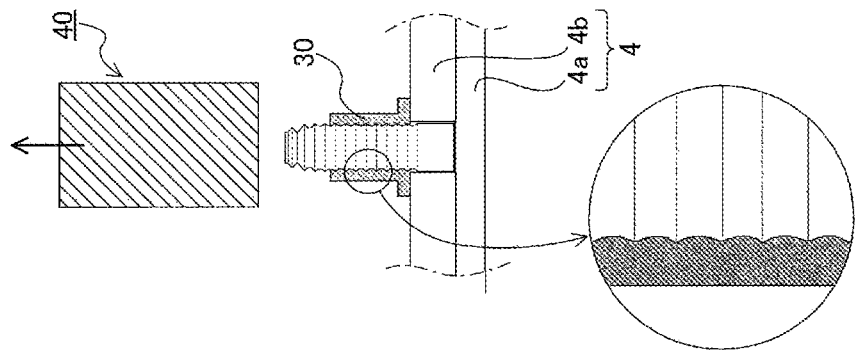
FIGS. 4A to 4D show the fastening procedure for fastening components using the fastening member in the embodiment.

When the pin (10) has been inserted into the insertion hole (6) in the second component (4b), the collar (30) is fitted around the groove part (18) protruding through the second component (4b), as shown in FIGS. 3C and 4A. The inner wall of the collar (30) at this time does not have anything like concavities and convexities that engage with the groove part (18). This means that the collar (30) merely fitted around the groove part (18) can come off of the pin (10).

Figure 4B:
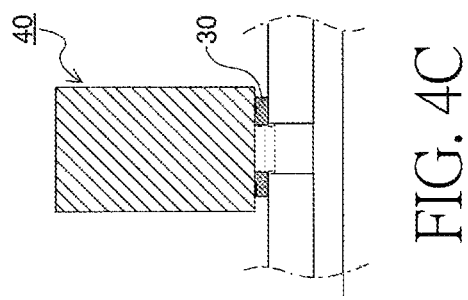
Figure 4C:
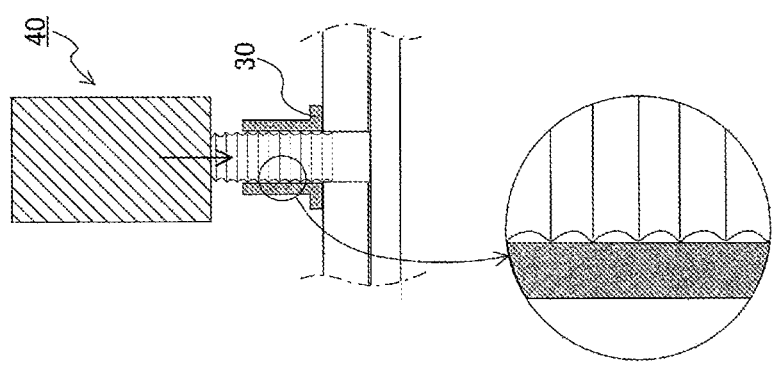
Figure 4D:
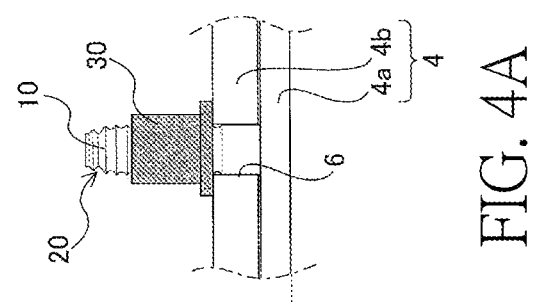

FIGS. 4B to 4D illustrate the swaging of the collar (30). FIGS. 4B to 4D partially show the cross-section of the insertion hole (6) and the collar (30) for the purpose of convenience (the cross-section is simply shown without hatching or the like). The swaging tool is not illustrated in detail.

An example of an installation tool (40) for swaging is BobTail® (Alcoa Fastening Systems, USA). The installation tool (40) has a grabber (not illustrated), which grabs the non-welding end ridge part (20) of the pin (10) and drags this part to the side of the installation tool (40), as shown in FIG. 4B. Thus, the pin (10) is elongated.

As shown in FIG. 4C, a swaging anvil (not illustrated) wraps around the collar (30) and swages this in the direction of the groove part (18) of the pin (10) (inward). Thus, the gap between the collar (30) and the pin (10) is closed, and the groove part (18) of the pin (10) bites into the inner wall of the collar (30) (swaging). The swaging reduces the diameter of the collar (30). The collar (30) becomes thinner and longer, and the pin (10) is elongated as described above, generating an axial force in the fastening member (1).

After the swaging of the collar (30) to the pin (10) using the installation tool (40) (see the enlarged illustration in FIG. 4D), the installation tool (40) is taken off of the pin (10), as shown in FIG. 4D. Through the process described above, the fastening of the first and second components (4a, 4b) using the pin (10) and the collar (30) is completed.

As explained above, this embodiment unites the pin (10) with the first component (4a) by welding the pin (10) to the first component (4a). An advantage is that if one of the components (4) (the second component (4b) in this embodiment) has a hole (an insertion hole (6)) formed, this will be sufficient. In addition, the pin (10) inserted into the insertion hole (6) (consequently the first component (4a)) is prevented from loosening from the second component (4b). Furthermore, the non-helical structure of the groove part (18) of the pin (10) prevents the pin (10) from loosening like an ordinary screw while the pin (10) is in engagement with the collar (30). The swaging of the collar (30) to the pin (10) allows maintaining the firm fixation even in strongly vibrating environments.

Thus, the present invention provides a fastening structure for fastening the first and second component (4a, 4b), wherein said fastening structure comprises a pin (10) that has non-helical grooves running in a circumferential direction and aligned along a longitudinal direction, and a collar (30) that is fitted around said pin (10), and said pin (10) is united with said first component (4a) by bonding one end of said pin (10) in the longitudinal direction to said first component (4a) without forming a hole in said first component (4a), and said second component (4b) has a hole (6) for inserting said pin (10) so that said collar (30) is fitted around and swaged to said pin (10) protruding through the hole (6).

The fastening structure described above can be used to fasten three or more components instead of two components (the first and second components (4a, 4b) in this embodiment).

The present invention provides a fastening method for fastening the first and second components (4a, 4b), wherein said fastening method comprises a pin (10) that has non-helical grooves running in a circumferential direction and aligned along a longitudinal direction, and a collar (30) that is fitted around said pin (10), and said pin (10) is united with said first component (4a) by bonding one end of said pin (10) in the longitudinal direction to said first component (4a) without forming a hole in said first component (4a), said second component (4b) has a hole and is fitted around said pin (10), which has been united with said first component (4a), from the other end of said pin (10) in the longitudinal direction, and said collar (30) is fitted around said pin (10), which has penetrated said second component (4b), from the other end of said pin (10) in the longitudinal direction and swaged to said pin (10).

Such a fastening method has the advantage that an insertion hole (6) in the second component (4b) alone will be sufficient because the first component (4a) and the pin (10) are united together. This reduces the labor for forming holes and prevents the cost increase and strength deterioration due to the forming of holes.

Figure 5:
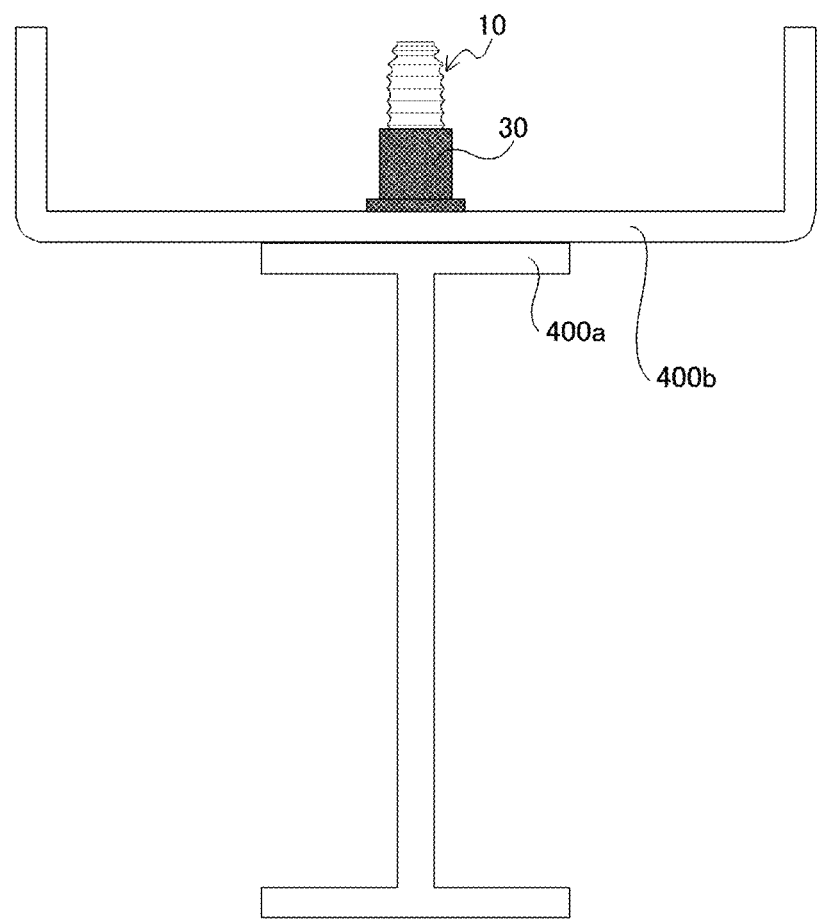
FIG. 5 shows the fastening structure in the embodiment.

FIGS. 5 to 8 show examples of the fastening method for fastening the first and second components using the pin (10) and the collar (30) in this embodiment. In FIG. 5, the first component (400a) is an H-shaped steel component, and the second component (400b) is a U-shaped steel component or other U-shaped component. The first component (400a) has a web and two plate-like flange portions respectively connected to two ends of the web. In other words, the web is connected to a back surface of the flange portion. As shown in FIG. 5, the first and second components (400a, 400b) can be fastened together using the pin (10) and the collar (30) according to the present invention without forming a hole (an insertion hole) in the center of the first component (400a) (the H-shaped steel component). The pin (10) is perpendicular to the flange portion and aligned to the web.

Figure 6:
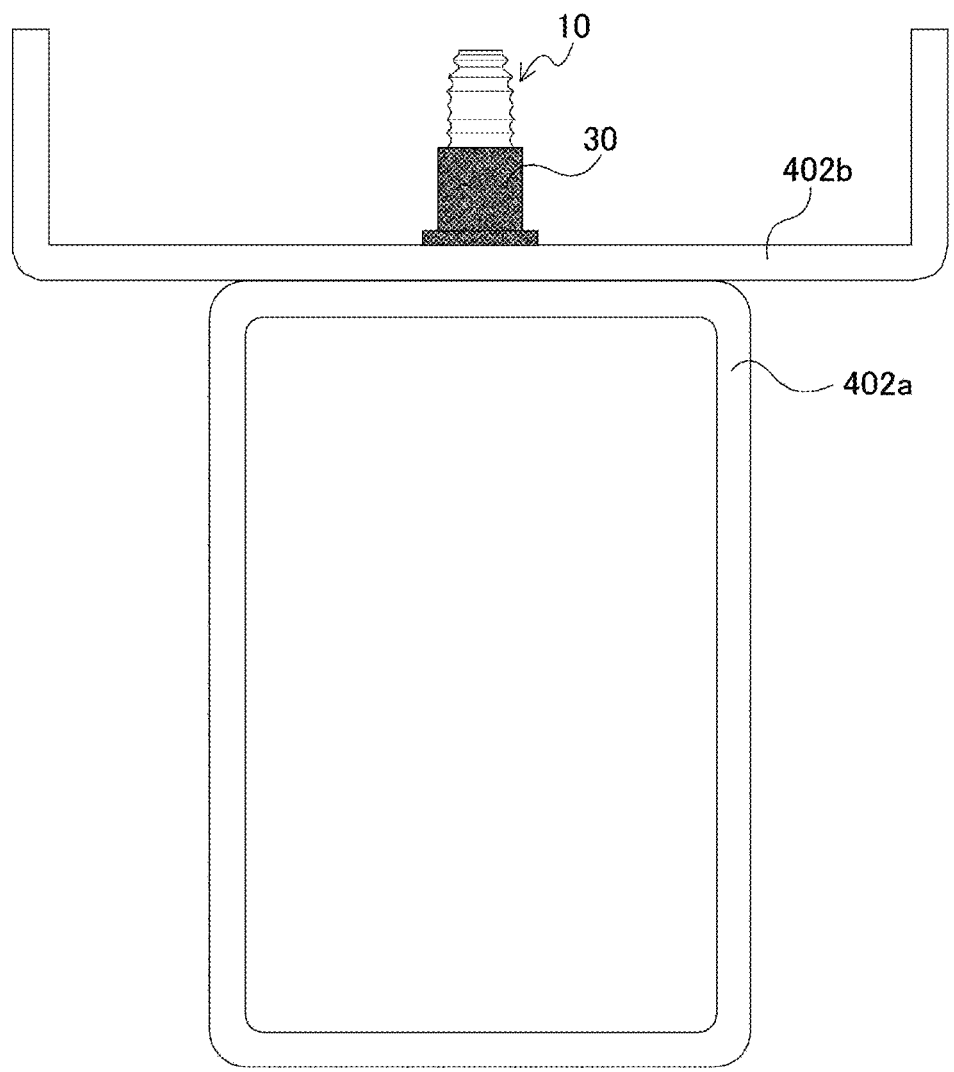
FIG. 6 shows the fastening structure in the embodiment.

In FIG. 6, the first component (402a) is a metal pipe, and the second component (402b) is a U-shaped steel component. As shown in FIG. 6, the first component (402a) (a metal pipe with a closed cross-section) and the second component (402b) (a U-shaped steel component) can be fastened together using the pin (10) and the collar (30) according to the present invention.

Figure 7:
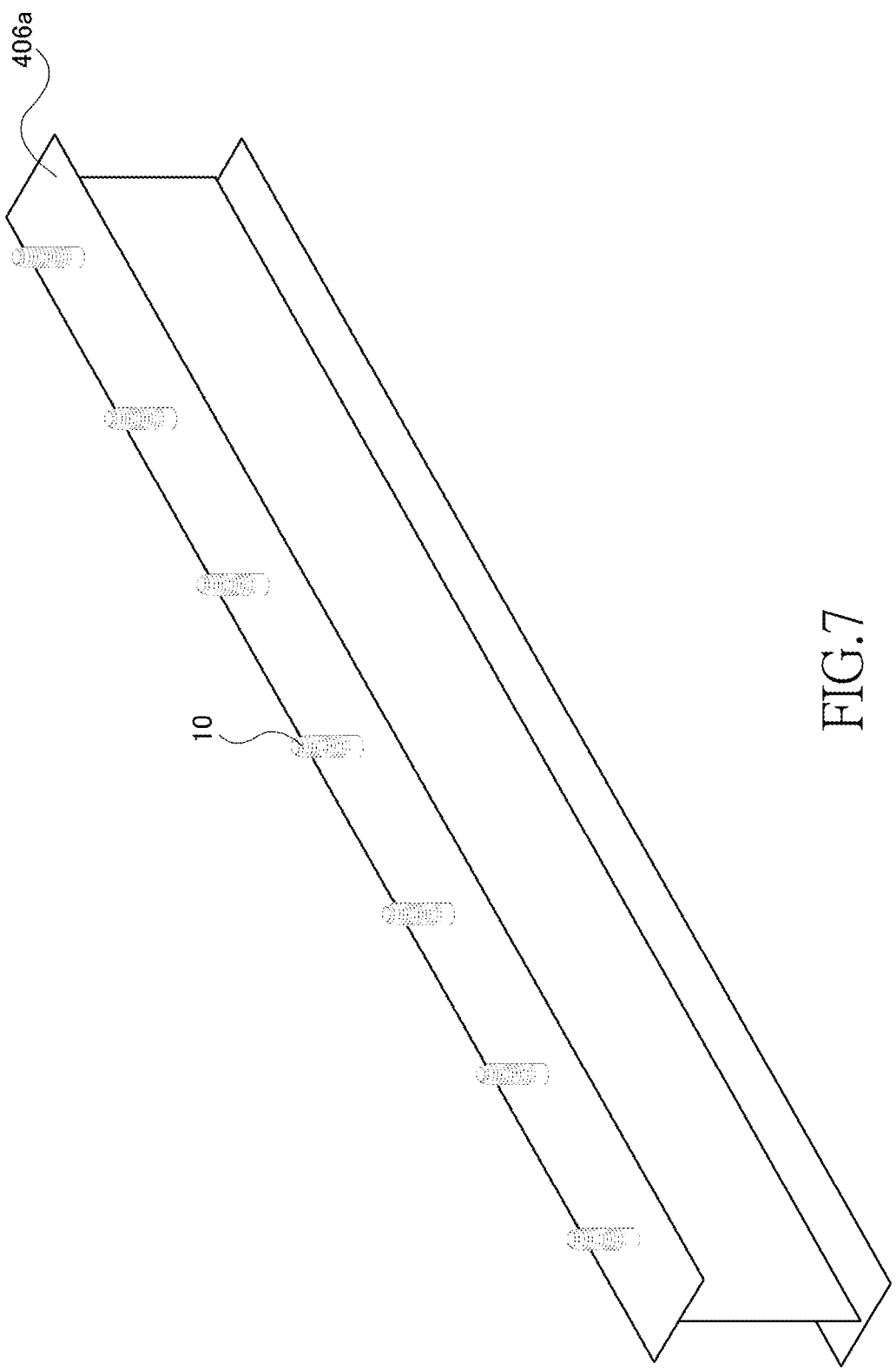
FIG. 7 shows the pins bonded to a first component by welding and other processes.
Figure 8:
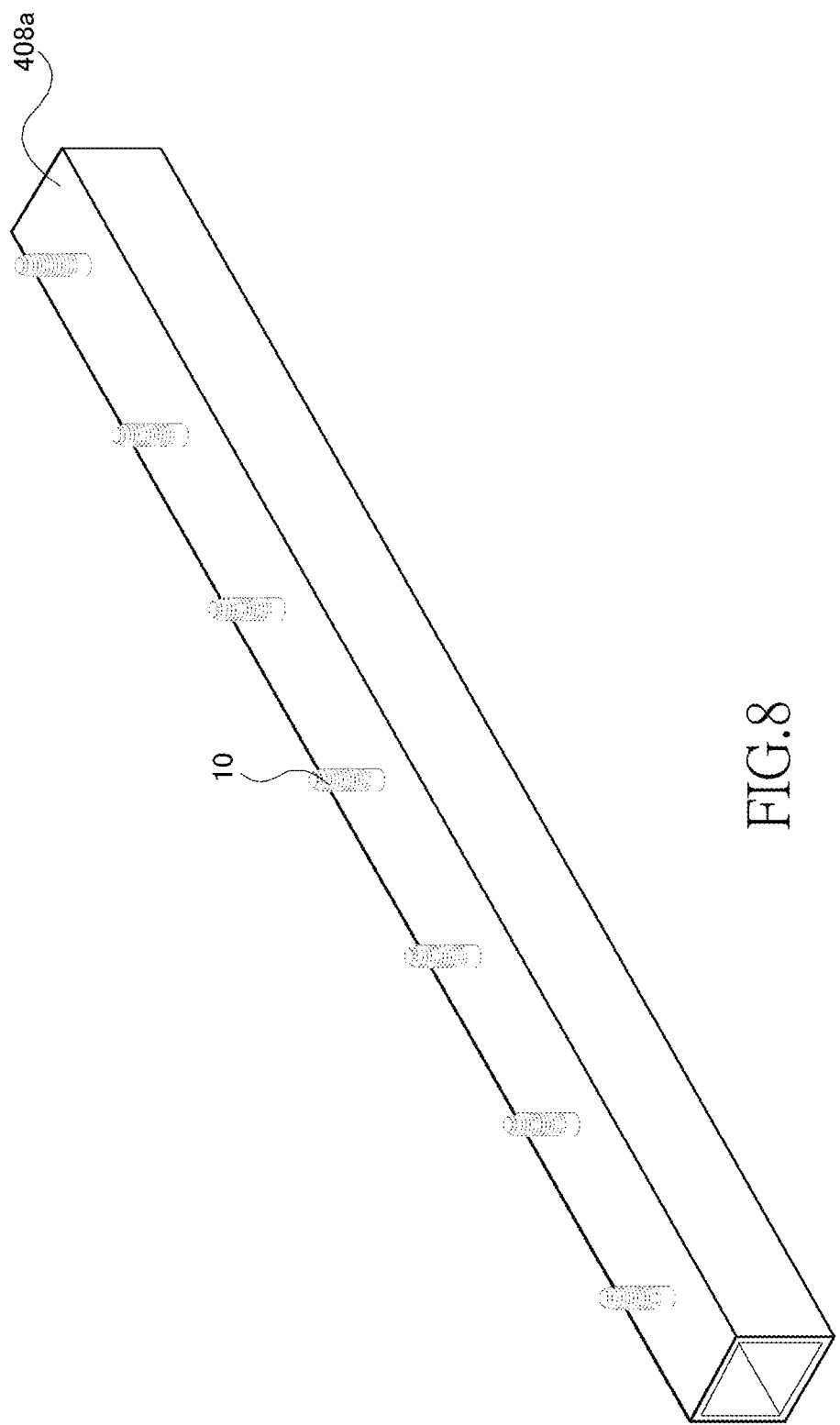
FIG. 8 shows the pins bonded to a first component by welding and other processes.

In FIGS. 7 and 8, some pins (10) are bonded to the first component (406a, 408a) by welding and other processes. The fastening method using pins (10) and collars (30) in this embodiment makes it possible to determine the precise positioning of the pins (10) beforehand in a factory, not at the very moment and place of fastening.

Figure 9:
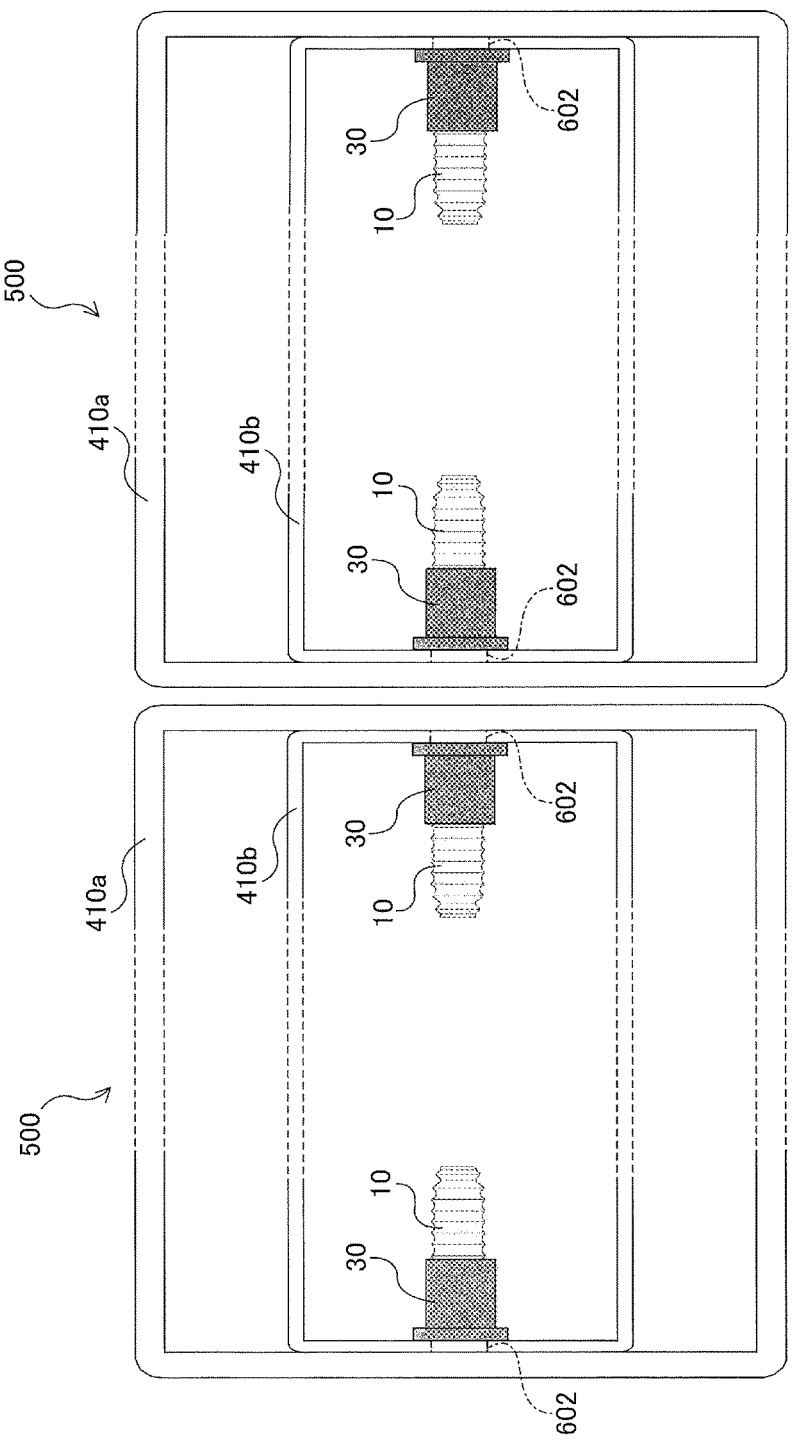
FIG. 9 shows the fastening structure in the embodiment.
Figure 12:
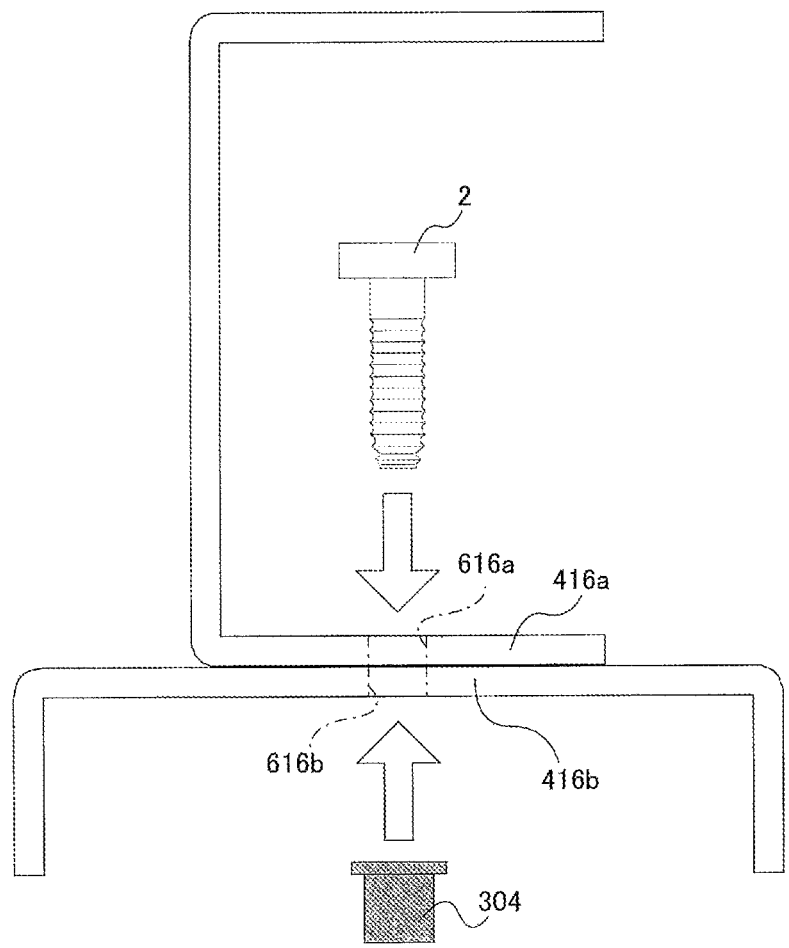
FIG. 12 shows a fastening of components using a conventional pin.
Figure 13:
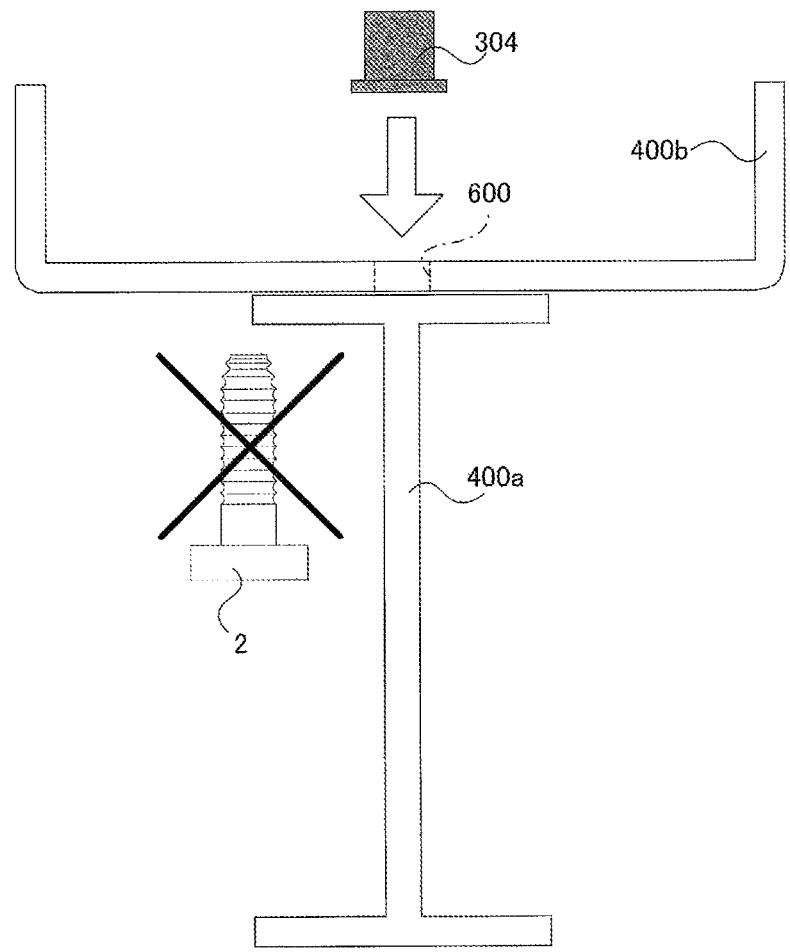
FIG. 13 shows a problem in fastening components using a conventional pin.
Figure 14:
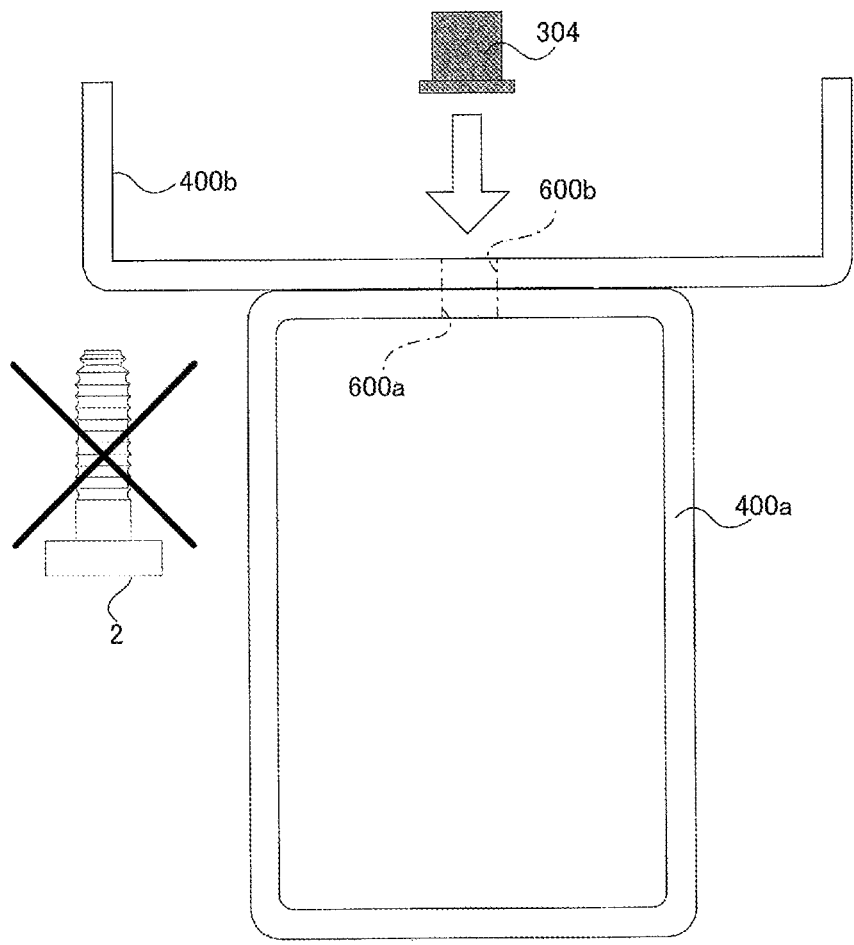
FIG. 14 shows a problem in fastening components using a conventional pin.
Figure 15:
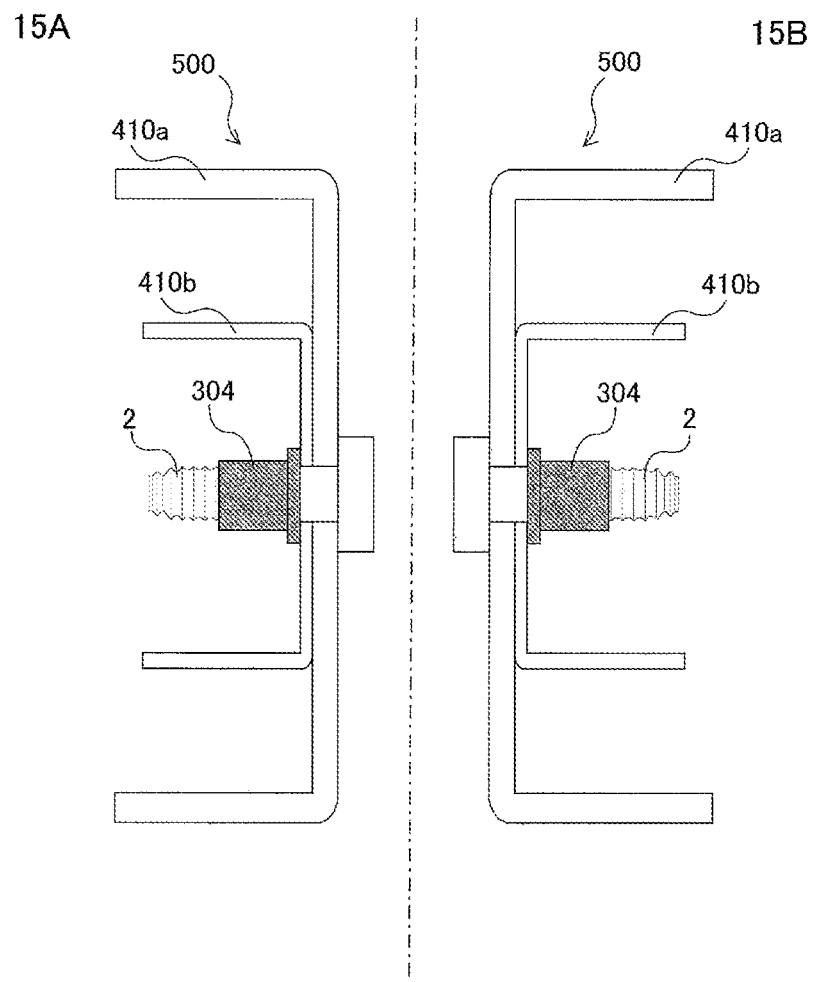
FIG. 15 shows a problem in fastening components using conventional pins.
Figure 16:
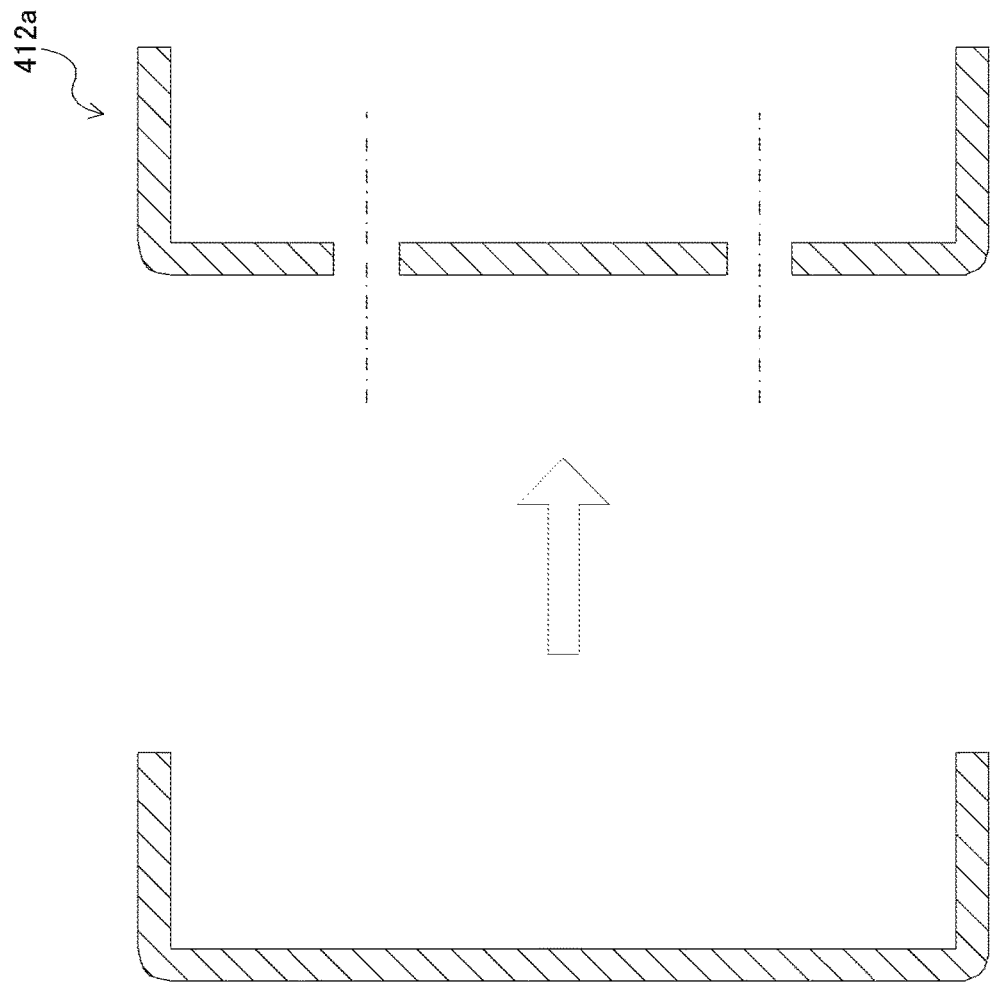
FIG. 16 shows the forming of holes in a component for using conventional pins.
Figure 17:
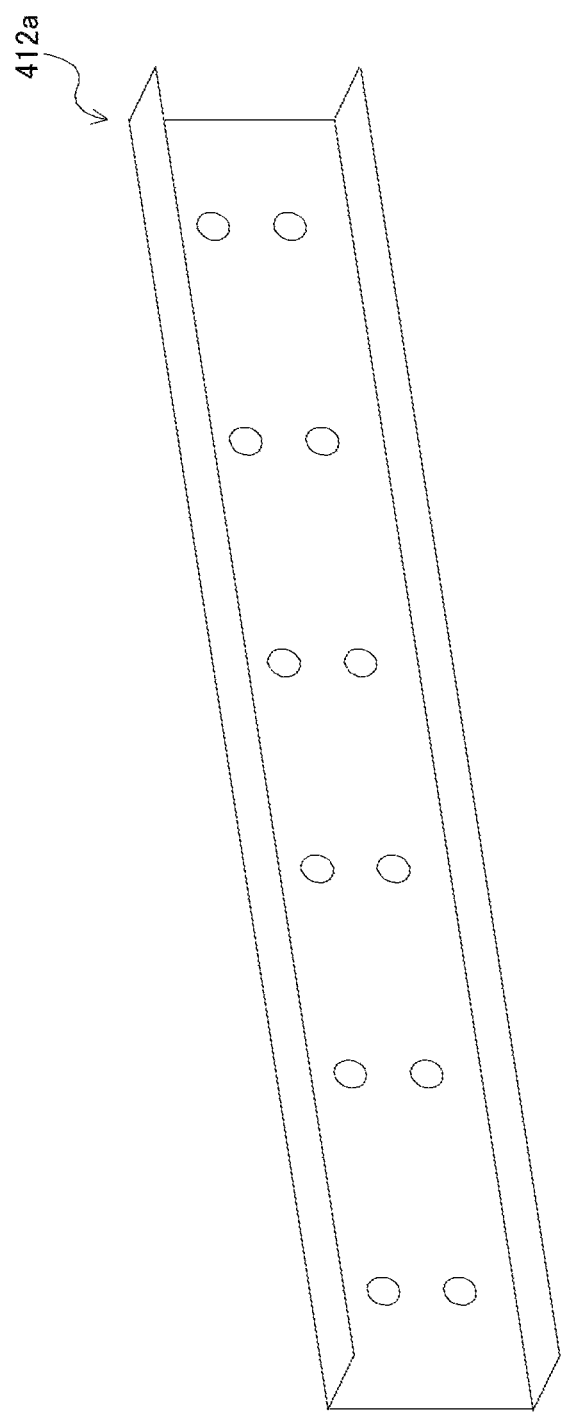
FIG. 17 shows the forming of holes in a component for using conventional pins.

In FIG. 9, the pins (10) in this embodiment are united with the first component (410a) by welding the pins (10) to the first component (410a) so that the pins (10) are positioned substantially perpendicular to the surface of the first component (410a). Then the pins (10) are inserted into insertion holes (602) in the second component (410b) whose form corresponds to the cross-section of the pins (10), followed by swaging with the collars (30). FIG. 9 shows two thus fastened products (500) placed back to back. The adjacent placement of the two fastened products shown in FIG. 9 is possible because the first component (410a) of each fastened product (500) maintains the flat surface while the opposite surface has the welded pin (10).

Other Embodiments

The pin (10) in the embodiment described above has a shaft (14) including a pillar part (16), as shown in FIGS. 1 to 4D. However, this is not an absolute requirement. For example, the groove part (18) may cover the whole shaft (14) (not illustrated). If the groove part (18) covers the whole shaft (14), the method according to the present invention can fasten even thin components (for example, with a thickness of 0.1 to 2.3 mm) together.

As shown in FIG. 10, the bonding part (12) of the pin (10) may have a form different from the form shown in FIGS. 1 to 3C. The bonding part (12) should have a form suitable for welding the pin (10) to the first component (4a) using an instant welding machine such as a stud welding machine (a form that allows easy electrical conduction). FIGS. 10A to 10F show possible examples of the bonding part.

The original embodiment uses an instant welding machine such as a stud welding machine to bond the pin (10) to the first component (4a). However, this is not an absolute requirement. Any method will do if it can bond the pin (10) to the first component (4a).

The swaging method and device in the original embodiment are not the only possible choices. The requirement is to reduce the diameter of the collar (30). The swaging method and device can be changed depending on the form of the collar (30). For example, an angular collar can be made thin by first pressing two opposite faces and then pressing the remaining two faces. Here the diameter reduction of the collar is called swaging, but this expression covers other process names that have the same meaning.

In the original embodiment, the first and second components (4a, 4b) are planar components. However, this is not an absolute requirement. It is possible that the first component (4a) includes a planar part, and the second component includes a planar part or subcomponent. The minimum requirement is that one of the first and second components (4a, 4b) allows the bonding (welding) of the pin (10), and the other allows the forming of the insertion hole (6). As shown in FIGS. 3B and 3C, the first surface (4b1) and the second surface (4b2) of the planar part are configured to extend from the insertion hole (6) and maintain substantially the same distance from each other.

The fastening method according to the present invention, specifically the method for fastening the first and second components (4a, 4b) using the pin (10) and the collar (30), can adopt different orders of steps from the order of steps described above. For example, if the first and second components (4a, 4b) are to be gaplessly fastened, the swaging of the collar (30) must come last in the fastening. However, if the first and second components (4a, 4b) are to be fastened with some allowance for a gap, the swaging of the collar (30) can come before inserting the pin (10) into the insertion hole (6) in the second component (4b) and bonding (welding, etc.) the bonding part (12) of the pin (10) to the first component (4a).

INDUSTRIAL APPLICABILITY

The present invention can be applied to fastening members in various industries, including electric machines, automobiles, homes, railways and furniture (racks).

REFERENCE SIGNS LIST

1 Fastening member
2 Conventional pin
4a, 400a, 402a, 406a, 408a, 410a, 412a, 414a, 416a First component (to be fastened)
4b, 400b, 402b, 406b, 408b, 410b, 412b, 414b, 416b Second component (to be fastened)
5 Fixation position
6, 602 Insertion hole
10 Pin
12 Bonding part
14, 142, 144 Shaft
16, 164 Pillar part
18, 182, 184 Groove part
20, 202, 204 Non-welding end ridge part
30, 304 Collar 40 Installation tool
500 Fastened products
600, 600a, 600b, 614a, 614b, 616a, 616b Holes

What is claimed is:

1. A fastening structure between metal components comprising:
   a first component that has a plate-like flange portion, and a web connected to a back surface of the flange portion;
   a pin that has a groove part having non-helical grooves running in a circumferential direction and aligned along a longitudinal direction, and one end of the pin in the longitudinal direction is erectly bonded to the surface of the flange portion of the first component corresponding to where the web is formed by welding;
   a second component that has a planar part having a first surface, a second surface and an insertion hole being able to be inserted through by the pin, the second component is stacked on the surface of the flange portion of the first component with the pin inserted in the insertion hole thus the first surface of the planar part and the surface of the flange portion of the first component are brought into surface contact with each other such that no gaps are formed between the planar part and the surface of the flange portion of the first component; and
   a collar that is fitted around said pin, and abutted against the second component, and a diameter of the collar being reduced so as to engage an inner wall of the collar with the grooves of the pin, wherein the second component is tightly fastened to the first component by the fastening structure,
   wherein both the first component and the second component are formed by metal,
   wherein the pin has a pillar part which has no grooves formed thereon and has peripheral dimensions corresponding to the inner circumference of the insertion hole,
   wherein the first surface and the second surface of the planar part are configured to extend from the insertion hole and maintain substantially the same distance from each other,
   wherein the groove part extends a predetermined distance from the second surface so as to be able to couple with the collar.

2. A fastening structure between metal components comprising:
   a pipe having a flat portion;
   a pin that has a groove part having non-helical grooves running in a circumferential direction and aligned along a longitudinal direction;
   a predetermined component that has a planar part having a first surface, a second surface and an insertion hole formed through the planar part, the pin being inserted into the insertion hole, the first surface of the planar part of the predetermined component being stacked on the flat portion of the pipe in a contact manner;
   a collar that is abutted against the predetermined component and is fitted around said pin, and a diameter of the collar is reduced so that the collar is fixed to the pin, wherein the predetermined component is tightly fastened to the pipe by the fastening structure; and
   wherein one end of the pin is fixed to the outer surface of the flat portion of the pipe at a portion of the pipe and is erectly coupled to the pipe by welding, said portion of the pipe is away from the edge of the pipe where is difficult to insert a pin through from the inner side of the pipe,
   wherein both the pipe and the predetermined component are formed by metal,
   wherein the pin has a pillar part which has no grooves formed thereon and has peripheral dimensions corresponding to the inner circumference of the insertion hole,
   wherein the first surface and the second surface of the planar part are configured to extend from the insertion hole and maintain substantially the same distance from each other,
   wherein the groove part extends a predetermined distance from the second surface so as to be able to couple with the collar.

3. A product arrangement having two products placed back to back, and each of the products has a fastening structure between metal components, the fastening structure of each product comprising:
   a first component having an outer side and an inner side, both of the outer side and the inner side are formed with a flat portion, wherein the flat portion of the outer side of the first component of one of the products is configured to be able to be contacted with the flat portion of the outer side of the first component of the other one of the products;
   a pin that has a groove part having a plurality of non-helical grooves formed on a circumferential direction along the longitudinal direction, and one end of the pin in the longitudinal direction being fixed to the flat portion of the inner side of the first component and erectly coupled to the first component by welding,
   a second component that has a planar part having a first surface, a second surface and an insertion hole formed through the planar part, the pin being inserted into the insertion hole, the first surface of the planar part of the second component being stacked on the flat portion of the inner side of the first component in a surface contact manner; and
   a collar that is fitted around the pin, and abutted against the second component, and a diameter of the collar being reduced so that the collar is fixed to the pin,
   wherein both the first component and the second component are formed by metal,
   wherein the pin has a pillar part which has no grooves formed thereon and has peripheral dimensions corresponding to the inner circumference of the insertion hole,
   wherein the first surface and the second surface of the planar part are configured to extend from the insertion hole and maintain substantially the same distance from each other,
   wherein the groove part extends a predetermined distance from the second surface so as to be able to couple with the collar.

* * * * *